(12) United States Patent
Setlak et al.

(10) Patent No.: US 11,036,844 B2
(45) Date of Patent: *Jun. 15, 2021

(54) WEARABLE ELECTRONIC DEVICE HAVING A LIGHT FIELD CAMERA

(71) Applicant: Apple Inc., Cupertino, CA (US)

(72) Inventors: Dale Setlak, Merritt Island, FL (US); Giovanni Gozzini, Berkeley, CA (US); Manohar B. Srikanth, Mountain View, CA (US); Mohammad Yeke Yazdandoost, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,574

(22) Filed: Sep. 17, 2020

(65) Prior Publication Data

US 2021/0004444 A1 Jan. 7, 2021

Related U.S. Application Data

(63) Continuation of application No. 16/132,241, filed on Sep. 14, 2018, now Pat. No. 10,817,594.

(Continued)

(51) Int. Cl.
*G06F 21/32* (2013.01)
*G06F 1/16* (2006.01)
(Continued)

(52) U.S. Cl.
CPC .............. *G06F 21/32* (2013.01); *G06F 1/163* (2013.01); *G06K 9/00382* (2013.01);
(Continued)

(58) Field of Classification Search
CPC ..... G06K 2009/00932; G06K 9/00382; G06K 9/00885; G06K 9/2027; G06F 1/163; G06F 1/1686; G06F 21/32; G06F 3/015
See application file for complete search history.

(56) References Cited

U.S. PATENT DOCUMENTS 4,437,089 A 3/1984 Achard
5,903,350 A 5/1999 Bush et al.
(Continued)

FOREIGN PATENT DOCUMENTS

CN 1603987 4/2005
CN 101639800 2/2010
(Continued)

OTHER PUBLICATIONS

Third Party Submission dated Apr. 2, 2019, 4 pages.
(Continued)

*Primary Examiner* — Omar S Ismail
(74) *Attorney, Agent, or Firm* — Brownstein Hyatt Farber Schreck, LLP

(57) ABSTRACT

A method of authenticating a user of a wearable electronic device includes emitting light into a dorsal side of a forearm near a wrist of the user; receiving, using a light field camera, remissions of the light from the dorsal side of the forearm near the wrist of the user; generating a light field image from the remissions of the light; performing a synthetic focusing operation on the light field image to construct at least one image of at least one layer of the forearm near the wrist; extracting a set of features from the at least one image; determining whether the set of features matches a reference set of features; and authenticating the user based on the matching. In some embodiments, the method may further include compensating for a tilt of the light field camera prior to or while performing the synthetic focusing operation.

21 Claims, 16 Drawing Sheets

Related U.S. Application Data

(60) Provisional application No. 62/564,916, filed on Sep. 28, 2017.

(51) Int. Cl.
*G06K 9/20* (2006.01)
*G06K 9/00* (2006.01)

(52) U.S. Cl.
CPC ....... *G06K 9/00885* (2013.01); *G06K 9/2027* (2013.01); *G06K 2009/00932* (2013.01)

(56) References Cited

U.S. PATENT DOCUMENTS

| | | |
|---|---|---|
| 6,072,894 A | 6/2000 | Payne |
| 6,146,332 A | 11/2000 | Pinsonneault et al. |
| 6,359,664 B1 | 3/2002 | Faris |
| 6,603,502 B2 | 8/2003 | Martin et al. |
| 6,775,397 B1 | 8/2004 | Hamalainen |
| 6,802,016 B2 | 10/2004 | Liu |
| 6,832,006 B2 | 12/2004 | Savakis et al. |
| 7,006,236 B2 | 2/2006 | Tomasi et al. |
| 7,009,378 B2 | 3/2006 | Blake et al. |
| 7,117,380 B2 | 10/2006 | Kangas |
| 7,136,513 B2 | 11/2006 | Waehner et al. |
| 7,151,530 B2 | 12/2006 | Roeber et al. |
| 7,164,781 B2 | 1/2007 | Kim et al. |
| 7,317,868 B2 | 1/2008 | Oshima et al. |
| 7,324,824 B2 | 1/2008 | Smith et al. |
| 7,369,685 B2 | 5/2008 | DeLean |
| 7,436,569 B2 | 10/2008 | Yao et al. |
| 7,536,037 B2 | 5/2009 | Sung et al. |
| 7,806,604 B2 | 10/2010 | Bazakos |
| 7,840,031 B2 | 11/2010 | Albertson et al. |
| 7,903,166 B2 | 3/2011 | Daly |
| 7,929,729 B2 | 4/2011 | Huang et al. |
| 8,035,728 B2 | 10/2011 | Subbotin et al. |
| 8,068,636 B2 | 11/2011 | Rodriguez et al. |
| 8,107,721 B2 | 1/2012 | Beardsley et al. |
| 8,154,615 B2 | 4/2012 | Fedorovskaya et al. |
| 8,233,094 B2 | 7/2012 | Subbotin et al. |
| 8,254,699 B1 | 8/2012 | Zhao et al. |
| 8,264,536 B2 | 9/2012 | McEldowney |
| 8,345,086 B2 | 1/2013 | Hirasawa |
| 8,462,989 B2 | 6/2013 | Mevissen |
| 8,600,120 B2 | 12/2013 | Gonion et al. |
| 8,698,753 B2 | 4/2014 | Jung et al. |
| 8,760,517 B2 | 6/2014 | Sarwar et al. |
| 8,880,865 B2 | 11/2014 | Abernethy et al. |
| 8,912,877 B2 | 12/2014 | Ling et al. |
| 8,976,277 B2 | 3/2015 | Fossum et al. |
| 9,357,024 B2 | 5/2016 | Salazar et al. |
| 9,536,362 B2 | 1/2017 | Sarwar et al. |
| 9,760,214 B2 | 9/2017 | Li |
| 10,135,822 B2 | 11/2018 | Adams |
| 10,372,191 B2 | 8/2019 | Valko et al. |
| 10,402,624 B2 | 9/2019 | Valko et al. |
| 2002/0158750 A1 | 10/2002 | Almalik |
| 2005/0221791 A1 | 10/2005 | Angelhag |
| 2006/0140452 A1 | 6/2006 | Raynor et al. |
| 2006/0274177 A1 | 12/2006 | Masaki et al. |
| 2007/0172099 A1 | 7/2007 | Park et al. |
| 2007/0253603 A1 | 11/2007 | Kimura et al. |
| 2008/0151105 A1 | 6/2008 | Kudou |
| 2009/0015666 A1 | 1/2009 | Greenway et al. |
| 2010/0008900 A1 | 1/2010 | Chan et al. |
| 2010/0158319 A1 | 6/2010 | Jung et al. |
| 2010/0253782 A1 | 10/2010 | Elazary |
| 2010/0328074 A1 | 12/2010 | Johnson et al. |
| 2011/0169934 A1* | 7/2011 | Pulluru ............... H04L 63/0861 348/77 |
| 2011/0262044 A1 | 10/2011 | Wang |
| 2012/0287031 A1 | 11/2012 | Valko et al. |
| 2013/0321581 A1* | 12/2013 | El-Ghoroury ............. H04N 5/04 348/46 |
| 2014/0062892 A1* | 3/2014 | Dickinson ............. G06F 1/1643 345/173 |
| 2014/0135612 A1* | 5/2014 | Yuen ...................... A61B 5/112 600/407 |
| 2014/0196131 A1* | 7/2014 | Lee .......................... G06F 21/32 726/7 |
| 2014/0266939 A1* | 9/2014 | Baringer ............ A61B 5/02416 343/729 |
| 2016/0267338 A1* | 9/2016 | Rice ....................... A44C 5/18 |
| 2017/0095171 A1* | 4/2017 | Park ................... A61B 5/02427 |
| 2018/0081439 A1* | 3/2018 | Daniels ................. G06F 3/015 |
| 2019/0095602 A1 | 3/2019 | Setlak et al. |

FOREIGN PATENT DOCUMENTS

| | | |
|---|---|---|
| DE | 102008047413 | 4/2010 |
| EP | 1672460 | 6/2006 |
| EP | 2216999 | 8/2010 |
| EP | 2315439 | 4/2011 |
| GB | 2453163 | 4/2009 |
| JP | 2002350555 | 12/2002 |
| JP | 2003153007 | 5/2003 |
| JP | 2004348349 | 12/2004 |
| JP | 2005521975 | 7/2005 |
| JP | 2007519317 | 7/2007 |
| JP | 2007532069 | 11/2007 |
| JP | 2011018320 | 1/2011 |
| TW | 200841276 | 10/2008 |
| WO | WO 10/021375 | 2/2010 |
| WO | WO 10/073547 | 7/2010 |
| WO | WO 10/095075 | 8/2010 |
| WO | WO 10/113075 | 10/2010 |
| WO | WO 10/127488 | 11/2010 |

OTHER PUBLICATIONS

Pascual et al., "Capturing Hand or Wrist Vein Images for Biometric Authentication Using Low-Cost Devices," Sixth International Conference on Intelligent Information Hiding and Multimedia Signal Processing, Carlos III University of Madrid, Electronics Technology Department, 2010, 5 pages.

Raghavendra et al., "A low cost wrist vein sensor for biometric authentication," Norwegian University of Science and Technology, published in Imaging Systems and Techniques (IST), 2016, IEEE International Conference, 5 pages.

Rahmann et al., "Reconstruction of Specular Surfaces Using Polarization Imaging," Proceedings of the IEEE Computer Conference on Computer Vision and Pattern Recognition, pp. I-149-I-155, 2001.

Sano et al., "Submicron Spaced Lens Array Process Technology for a High Photosensitivity CCD Image Sensor," IEEE, pp. 283-286, Dec. 1990.

Wolff et al., "Polarization Camera Sensors," Image and Vision Computing, pp. 497-510, vol. 13, No. 6, Aug. 1995.

* cited by examiner

WEARABLE ELECTRONIC DEVICE HAVING A LIGHT FIELD CAMERA

CROSS REFERENCE TO RELATED APPLICATIONS

This application is a continuation of U.S. patent application Ser. No. 16/132,241, filed Sep. 14, 2018, which is a nonprovisional of and claims the benefit under 35 U.S.C. § 119(e) of U.S. Provisional Patent Application No. 62/564,916, filed on Sep. 28, 2017, the contents of which are incorporated by reference as if fully disclosed herein.

FIELD

The described embodiments relate generally to a watch or other electronic device (e.g., another type of wearable electronic device). More particularly, the described embodiments relate to a wearable electronic device having a light field camera, and to techniques for performing bioauthentication of a user of the device from a dorsal side of a forearm near a wrist of the user.

BACKGROUND

An electronic device may include a fingerprint sensor, a facial recognition sensor, a retina scanner, or other form of bioauthentication sensor. In some devices, such as a phone or tablet computer, a bioauthentication sensor may be provided adjacent (or as part of) a display of the device. However, in a wearable electronic device such as a watch, there may be little or no room for providing a bioauthentication sensor adjacent (or as part of) a display of the device. User authentication may therefore be provided by means of a password or similar input.

SUMMARY

Embodiments of the systems, devices, methods, and apparatus described in the present disclosure are directed to a watch or other electronic device (e.g., another type of wearable electronic device) having a light field camera. The light field camera may be used to image a forearm near a wrist of a user. The imaging may be performed from a dorsal side of the forearm. A synthetic focusing operation may be performed on a light field image obtained from the light field camera, to construct at least one image of at least one layer of the forearm near the wrist. A set of features of the forearm near the wrist may be extracted from the at least one image and compared to a reference set of features (e.g., a hair follicle pattern, a vascular pattern, a vein pattern, an artery pattern, a blood perfusion pattern in skin, a blood perfusion pattern in tendons, a blood perfusion pattern in fascia, a tendon pattern, a connective tissue pattern, a skin pigmentation pattern, a pore pattern, and/or a bone shape pattern obtained during a bioauthentication enrollment process performed for the user). An operation (e.g., a bioauthentication operation, a bioauthentication enrollment operation, a secure transaction operation, a health monitoring operation, or a health assessment operation) may be performed in response to whether the set of features matches the reference set of features. In some embodiments, a tilt of the light field camera with respect to the dorsal side of the forearm may be determined and compensated for, prior to or while performing the synthetic focus operation.

In a first aspect, the present disclosure describes a watch body. The watch body includes a housing, a cover mounted to the housing, a light emitter, a light field camera, and a processor. The cover has a first surface exterior to the watch body, and a second surface interior to the watch body. The light emitter is positioned to emit light through the cover into a dorsal side of a forearm near a wrist of a user when the first surface of the cover is positioned adjacent the dorsal side of the forearm near the wrist of the user. The light field camera is positioned adjacent the second surface to receive remissions of the light through the cover from the dorsal side of the forearm near the wrist. The processor is configured to operate the light emitter and the light field camera, obtain a light field image from the light field camera, and perform a synthetic focusing operation on the light field image to construct at least one image of at least one layer of the forearm near the wrist.

In another aspect, the present disclosure describes another watch body. The watch body has a housing, a cover mounted to the housing, a light emitter, a light field camera, and a tilt sensor. The cover has a first surface exterior to the watch body, and a second surface interior to the watch body. The light emitter is positioned to emit light through the cover into a dorsal side of a forearm near a wrist of a user when the first surface of the cover is positioned adjacent the dorsal side of the forearm near the wrist. The light field camera is positioned adjacent the second surface to receive remissions of the light through the cover from the dorsal side of the forearm near the wrist. The tilt sensor is configured to detect a tilt of the light field camera with respect to the dorsal side of the forearm near the wrist.

In still another aspect of the disclosure, a method of authenticating a user of a wearable electronic device is described. The method includes emitting light into a dorsal side of a forearm near a wrist of the user; receiving, using a light field camera, remissions of the light from the dorsal side of the forearm near the wrist of the user; generating a light field image from the remissions of the light; performing a synthetic focusing operation on the light field image to construct at least one image of at least one layer of the forearm near the wrist; extracting a set of features from the at least one image; determining whether the set of features matches a reference set of features; and authenticating the user in response to the set of features matching the reference set of features.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
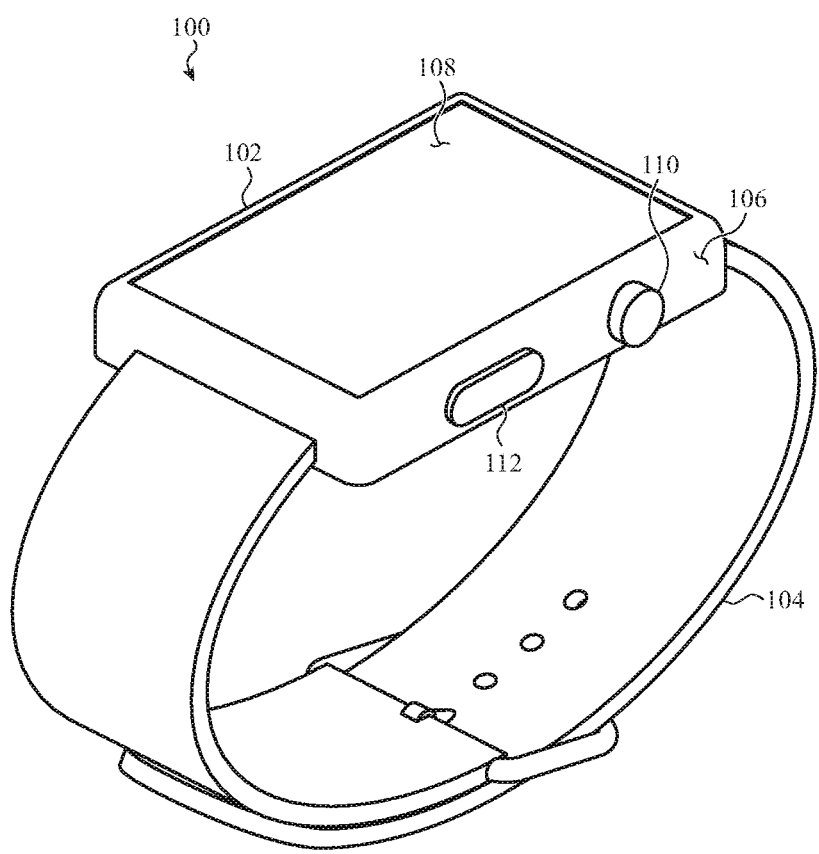
FIGS. 1 and 2 show an example of a watch including a biosensor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As previously mentioned, a wearable electronic device such as a watch may have little or no room for providing a biometric authentication (i.e., bioauthentication) sensor adjacent (or as part of) a display of the device. In a watch, a sensor can obtain measurements of biological parameters from the backside of the watch. However, bioauthentication via a backside sensor is complicated by the pattern, type, and density of a user's arm hair, which tends to be longer and more dense on the dorsal side of the forearm where a backside of a watch normally sits. Hair also tends to have a highly variable position, which can make it difficult to use for purposes of bioauthentication.

One type of sensor that could be used for bioauthentication via the backside of a watch is a vein pattern sensor (e.g., a camera). However, veins and arteries and other significant structures of the forearm near the wrist tend to be deep beneath the surface (skin) of the forearm. In some cases, light may emitted into a user's skin via the backside of a watch, and remitted (e.g., reflected or refracted) from features within a user's forearm near their wrist. However, light remitted from features deep within the forearm can be blurred by scattering as it propagates toward the surface of the skin Remitted light may also be scattered by arm hair. Depending on the user, a typical image sensor (or camera) positioned on the backside of a watch may receive little remitted light, and/or a processor may be unable to identify features of a user's forearm based on the light remitted from features of the forearm.

Another issue with performing bioauthentication using a sensor on the backside of a watch is that the footprint of the sensing area may be limited by the dimensions of the watch body, which can restrict the amount of data that an image sensor is able to acquire.

Wearable electronic devices and techniques described herein utilize a biosensor system including a light field camera. In such a system, light, such as infrared light, is emitted deep within a user's forearm. Remission of the light is captured by a light field camera. A light field camera is a camera that not only captures the intensity of received light, but the intensities of light received in particular light rays (or small sets of light rays) received from different directions. In some embodiments, a light field camera may include an array of micro-cameras, with each micro-camera having an image sensing region, which image sensing region has a limited field of view defined by a pinhole or microlens. The pinhole or microlens limits the image sensing region's field of view to a set of light rays that passes through the same pinhole or microlens, but from different directions. Thus, each pixel value of the image sensing region can be associated with directional information based on the relationship of the pinhole or microlens to particular pixels of the image sensing region. A light field image may include a set of images acquired by the different micro-cameras in the light field camera (or a set of images acquired by a subset of the micro-cameras). The fields of view (or targets) of each micro-camera overlap, and the resolution of a light field camera can be increased by configuring the fields of view to have significant overlap (e.g., in some embodiments, there may be a 50%, 75%, 90%, or greater overlap between the fields of view of adjacent micro-cameras).

A synthetic focusing operation (e.g., a tomographic-style focusing operation) may be performed on a light field image. The synthetic focusing operation may constructively and deconstructively combine the pixel values of different images (e.g., elemental images) within a light field image, to construct images of layers at different distances from the sensing plane (i.e., images of different layers of a user's forearm). A variety of exemplary synthetic focusing operations are well-known in the art and may be based on shifting, scaling, adding, subtracting, and averaging pixel values. A processor may therefore extract, from the images of one or more layers constructed during a synthetic focusing operation, a set of features of a user's forearm. The set of features may include, for example, a hair follicle opening pattern, a hair follicle pattern, a vascular pattern, a vein pattern, an artery pattern, a blood perfusion pattern in skin, a blood perfusion pattern in tendons, a blood perfusion pattern in fascia, a tendon pattern, a connective tissue pattern, a skin pigmentation pattern, a small scale folding pattern of skin, a pore opening pattern, a pore pattern, and/or a bone shape pattern.

Synthetic focusing performed on a light field image may not only be used to extract features of a user's forearm from the light field image, may be used to classify the features based on size, depth, color, movement, variance between layers, existence in one or more layers, relationships with other features (e.g., relationships based on size, depth, color, or movement with respect to other features), and so on. Although synthetic focusing may not fully remove the blurring caused by turbid biological materials and light scattering as remitted light propagates toward a user's skin from deeply located structures, synthetic focusing may de-emphasize features/patterns located in front of other features/patterns, which close features/patterns might otherwise obscure deeper features/patterns.

In some embodiments, a processor that performs a synthetic focusing operation may utilize a hardware accelerator to perform part or all of the synthetic focusing operation.

These and other embodiments are discussed with reference to FIGS. 1-16. However, those skilled in the art will readily appreciate that the detailed description given herein with respect to these figures is for explanatory purposes only and should not be construed as limiting.

The present disclosure recognizes that personal information data, including the biometric data acquired using the presently described technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Figure 2:
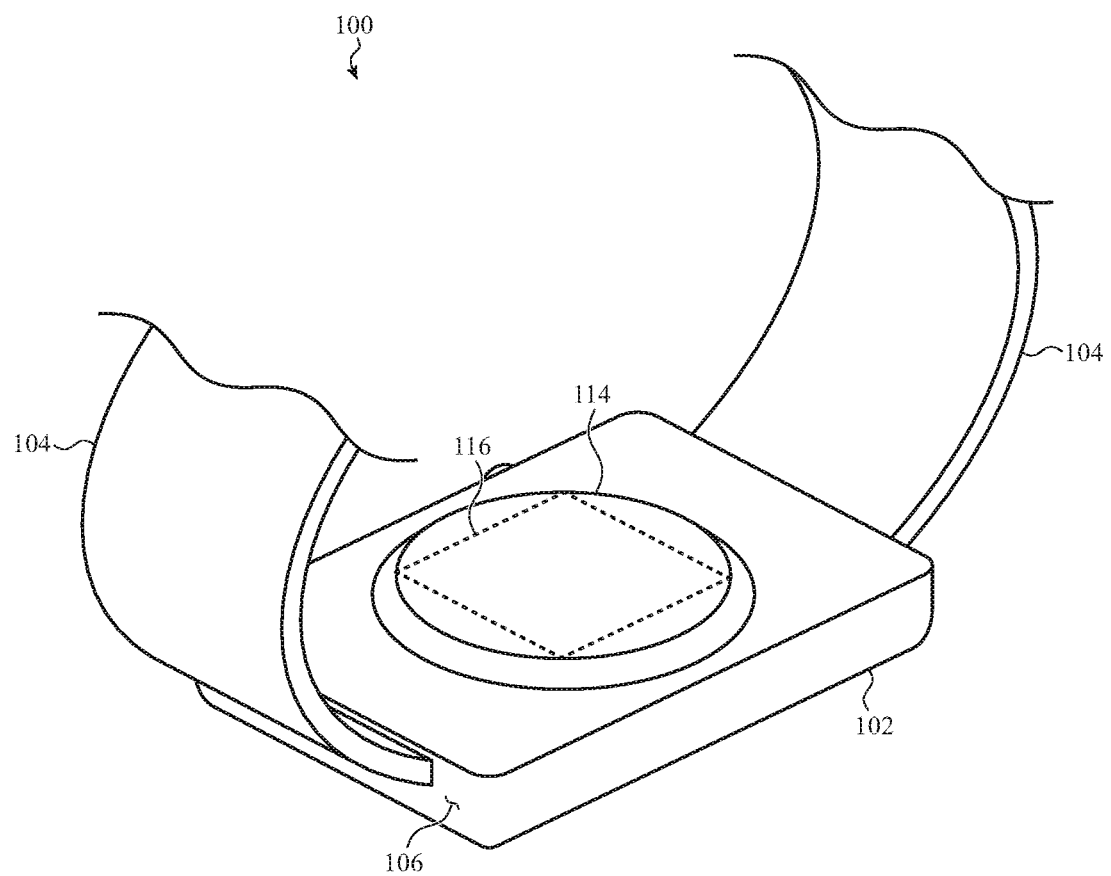

FIGS. 1 and 2 show an example of a watch 100 including a biosensor system 116. The watch 100 may include a watch body 102 and a watch band 104. The watch 100 and watch body 102 are examples of wearable electronic devices. Other wearable electronic devices that may include a biosensor system, such as one of the biosensor systems described in the present disclosure, include health monitoring or fitness devices, portable computing devices, mobile phones (including smart phones), or digital media players. In some embodiments, the functions of some or all of these other wearable electronic devices may be incorporated into a watch, such as the watch 100.

The watch body 102 may include a housing 106. The housing 106 may include one or more housing members. A singular housing member is shown in FIG. 1. The housing 106 may be metallic, plastic, ceramic, or crystalline, or may include a combination of such materials, or may include other materials.

A cover 108 may be mounted to the housing 106 on a front side of the watch body 102 (i.e., facing away from a user's skin), as shown in FIG. 1. The cover 108 may protect a display within the housing 106 (and in some cases, the display may be mounted partly or wholly to the cover 108). The display may be viewable by a user through the cover 108. In some cases, the cover 108 may be part of a display stack, which display stack may include a touch sensing or force sensing capability. The display may be configured to depict a graphical output of the watch 100, and a user may interact with the graphical output (e.g., using a finger, stylus, crown 110, or button 112). As one example, the user may select (or otherwise interact with) a graphic, icon, or the like presented on the display. For example, the user may interact with a graphic on the display by touching or pressing on the display at the location of the graphic. The cover 108 may be considered separate from the housing 106, or alternatively, the cover 108 may be considered a component (e.g., a housing member) of the housing 106. In some examples, the cover 108 may be a crystal, such as a sapphire crystal. The cover 108 may alternatively be formed of glass, plastic, or another material (or materials) that is transmissive to at least one wavelength of light (e.g., visible light).

Another cover 114 may be mounted to the housing 106 on a back side of the watch body 102 (i.e., facing a user's skin), as shown in FIG. 2. The cover 114 may protect part or all of a biosensor system 116 mounted within the housing 106 (and in some cases, the biosensor system 116 may be mounted partly or wholly to the cover 114). The biosensor system 116 may include a light field camera positioned adjacent the cover 114 to receive light through the cover 114. The biosensor system 116 may be configured to image a forearm of a user near a wrist of the user, and perform a bioauthentication of the user based on the imaging. The cover 114 may be considered separate from the housing 106, or alternatively, the cover 114 may be considered a component (e.g., a housing member) of the housing 106. In some examples, the cover 114 may be a crystal, such as a sapphire crystal. The cover 114 may alternatively be formed of glass, plastic, or another material that is transmissive to at least one wavelength of light (e.g., visible light, such as infrared light, or invisible light (i.e., other forms of electromagnetic radiation)).

The watch body 102 may include at least one input device or selection device, such as a crown assembly, scroll wheel, knob, dial, button, or the like, which input device may be operated by a user of the watch 100. For example, the housing 106 may include an aperture through which a shaft extends. A crown 110 may be attached to the shaft, and may be accessible to a user exterior to the housing 106. The crown 110 may be manipulated by a user to rotate or translate the shaft. The shaft may be mechanically, electrically, magnetically, and/or optically coupled to components within the housing 106 as one example. A user's manipulation of the crown 110 and shaft may be used, in turn, to manipulate or select various elements displayed on the display, to adjust a volume of a speaker, to turn the watch 100 on or off, and so on. The housing 106 may also include an aperture through which a button 112 protrudes.

The housing 106 may include structures for attaching the watch band 104 to the watch body 102. In some cases, the structures may include elongate recesses or apertures through which ends of the watch band 104 may be inserted and attached to the watch body 102. In other cases (not shown), the structures may include indents (e.g., dimples or depressions) in the housing 106, which indents may receive ends of spring pins that are attached to or threaded through ends of a watch band to attach the watch band to the watch body.

The watch band 104 may be used to secure the watch 100 to a user, another device, a retaining mechanism, and so on.

In some examples, the watch 100 may lack the cover 108, the display, the crown 110, or the button 112. For example, the watch 100 may include an audio input or output interface, a touch input interface, a haptic (force) input or output interface, or other input or output interface that does not require the display, crown 110, or button 112. The watch 100 may also include the afore-mentioned input or output interfaces in addition to the display, crown 110, or button 112. When the watch 100 lacks the display, the front side of the watch 100 may be covered by the cover 108, or by a metallic or other type of housing member.

In some embodiments, each of the covers 108, 114 may include any transparent, semi-transparent, or translucent surface made out of glass, a crystalline material (such as sapphire or zirconia), plastic, or the like, has and may have a crystal or non-crystalline atomic structure.

Figure 3:
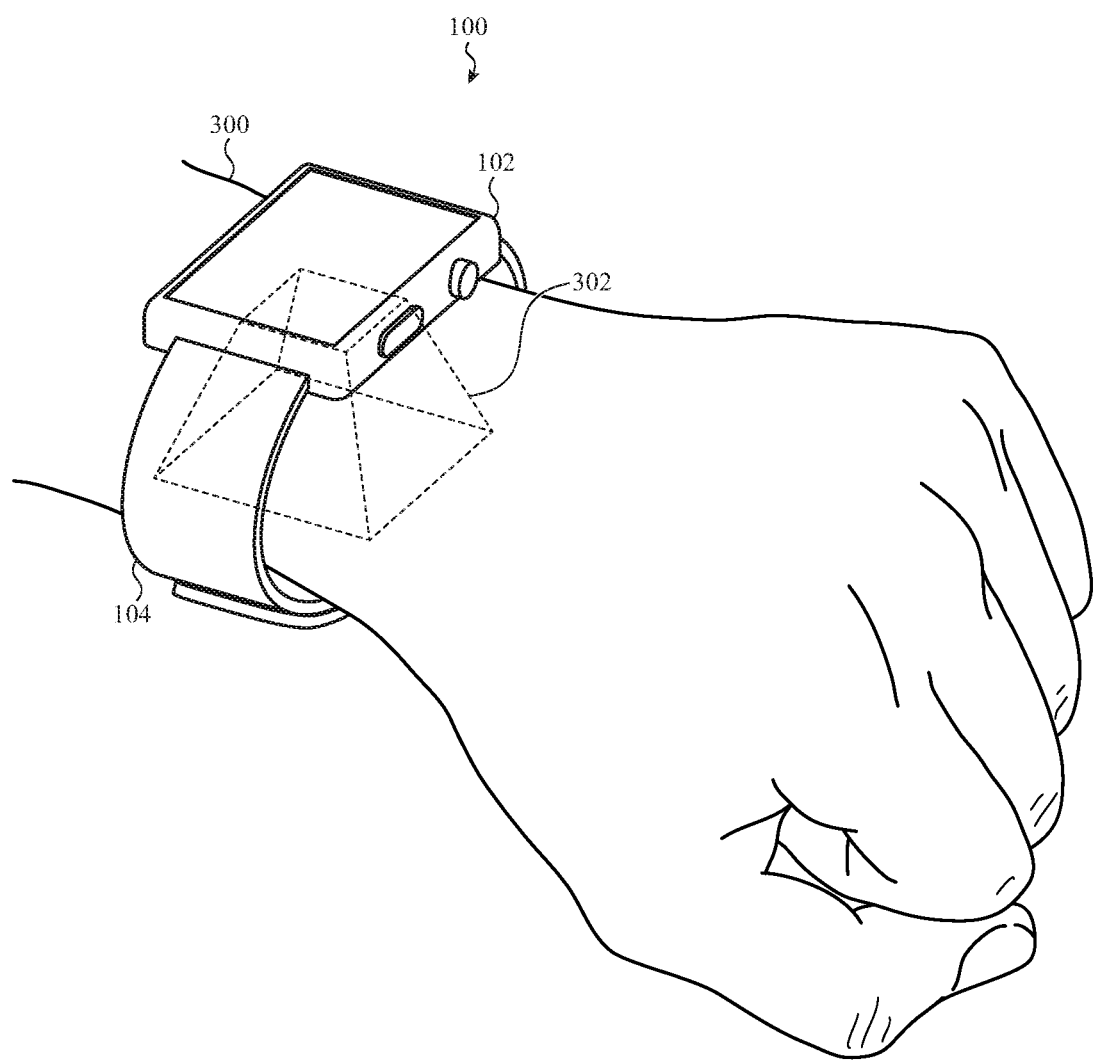
FIG. 3 shows the watch of FIGS. 1 and 2 attached to a forearm of a user near the user's wrist.

Turning now to FIG. 3, the watch 100 is shown attached to a forearm 300 of a user near the user's wrist. Attachment of the watch 100 to the forearm 300 near the wrist may position a first or exterior surface of the cover 114 (i.e., a surface exterior to the watch body 102) adjacent a dorsal side of the forearm 300 near the user's wrist.

The biosensor system 116 may include a light emitter (or set of light emitters) positioned to emit light into the dorsal side of the forearm 300 near the wrist. The biosensor system 116 may also include a light field camera positioned within the watch body 102, adjacent a second or interior surface of the cover 114 (i.e., a surface interior to the watch body 102). The light field camera may receive, from the dorsal side of the forearm 300 near the wrist, remissions of the light emitted by the light emitter(s). The remissions of light may include reflections and refractions of the light by features on or within the forearm 300 of the user near the user's wrist (e.g., features of skin, hair, hair follicles, pores, vascular structures, connective tissues, bones, and so on).

A processor (e.g., a processor within the watch body 102) may be configured to operate the light emitter(s) and light field camera to obtain a light field image from the light field camera. In some embodiments, the light field camera or another sensor of the watch 100 (e.g., a proximity sensor) may detect when the watch 100 is positioned on and/or attached to the user's forearm 300 and trigger the processor to operate the light emitter(s) and light field camera, obtain a light field image from the light field camera, and perform an operation such as a bioauthentication operation, a bioauthentication enrollment operation, a secure transaction operation, a health monitoring operation, or a health assessment operation using the light field image. In some embodiments, a utility or application running on the watch 100 (or a utility or application running remote from the watch 100) may trigger the processor to operate the light emitter(s) and light field camera, obtain a light field image from the light field camera, and perform an operation such as a bioauthentication operation, a bioauthentication enrollment operation, a secure transaction operation, a health monitoring operation, or a health assessment operation using the light field image.

In some examples, the light field camera of the biosensor system 116 may include a set of micro-cameras having overlapping fields of view (i.e., an array of micro-cameras). Each camera may be operable to acquire an image (e.g., an elemental image), which image may include a plurality of pixel values. Each pixel value may indicate the intensity of a light ray remitted from a particular direction (or in practice, the intensity of a small number of light rays remitted from a small set of directions). Associations between pixel values and light ray directions may be established by an array of light-transmissive elements such as pinholes or microlenses, which light-transmissive elements restrict the apertures of the micro-cameras and/or direct rays of light remitted from particular directions to particular pixels of the micro-cameras.

The light field image obtained by the processor may include a set of images (e.g., a set of elemental images) acquired by some or all of the micro-cameras of a light field camera. The processor may be configured to perform a synthetic focusing operation on the light field image to construct images of one or more layers of the user's forearm 300 near the user's wrist (e.g., an image of at least one layer in the three-dimensional space 302 defined by the overlapping fields of view of the micro-cameras of the light field camera in the biosensor system 116; see FIGS. 2 and 3). Performance of the synthetic focusing operation may entail combining pixel values in the set of images in different ways to construct images of different layers of the user's forearm 300.

The processor may be configured to extract a set of features from the image(s) constructed during the synthetic focusing operation. The set of features may include, for example, features of skin, hair, hair follicles, pores, vascular structures, connective tissues, bones, and so on, as described in greater detail with reference to FIGS. 4 and 5. In some embodiments, the processor may compare the set of features to a reference set of features, to determine whether the set of features matches the reference set of features. When the reference set of features are features of an authorized user (e.g., an authorized user of the watch 100, of a service provided by the watch (e.g., a payment, banking, or other secure transaction service), etc.), and when the set of features matches the reference set of features, the processor may, for example, authenticate the user of the watch 100 and enable the user to access the watch 100, or access a function of the watch 100, or complete a secure transaction. When the reference set of features are features associated with a health status or condition, and when the set of features matches the reference set of features, the processor may, for example, indicate that the user of the watch 100 may have the associated health status or condition, or provide an alert to medical personnel. When the biosensor system 116 is operated as a part of a bioauthentication enrollment operation, the processor may store the set of features identified from the image(s) constructed during the synthetic focusing operation, so that the set of features may be accessed at a later time as a reference set of features (e.g., as a set of features associated with an authorized user, or as a set of features associated with a baseline health or condition of the user).

Figure 4:
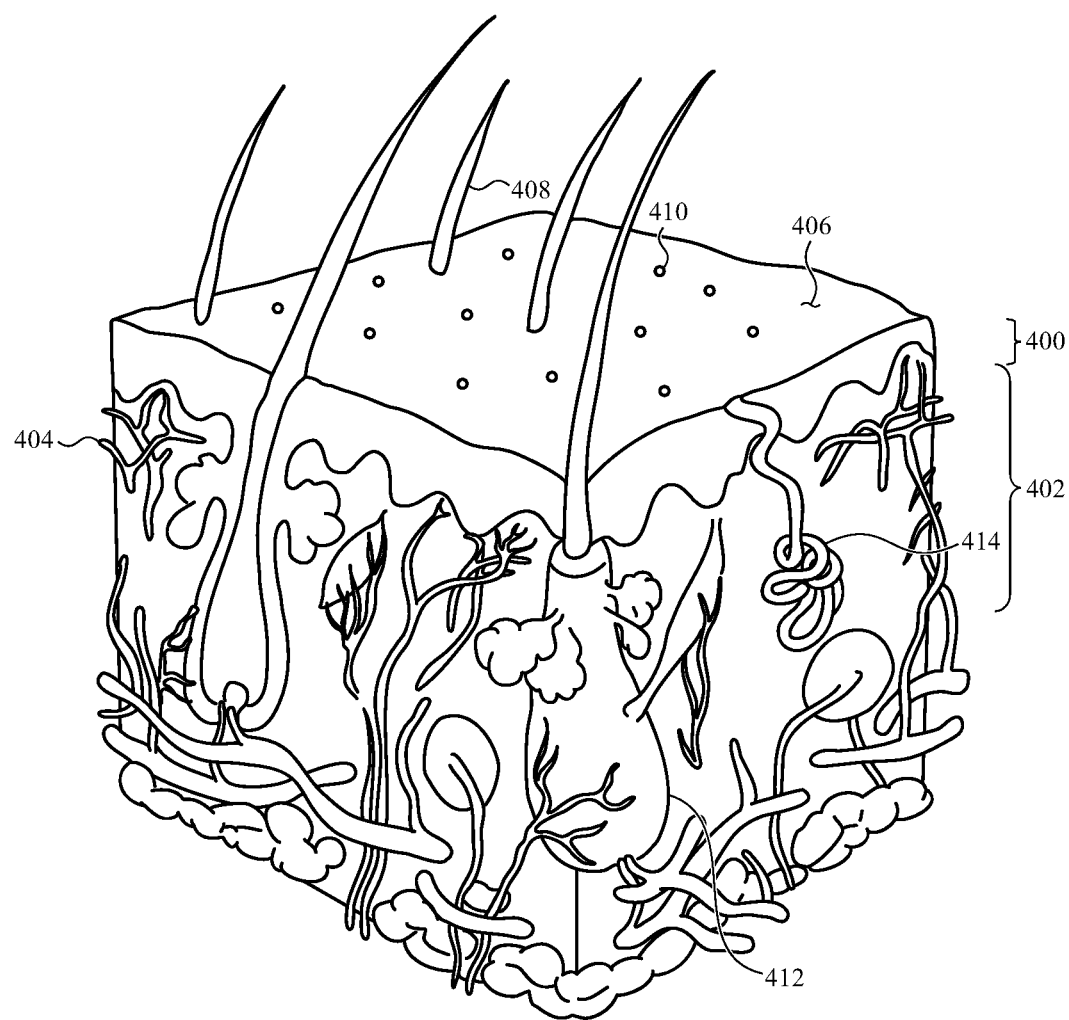
FIGS. 4 and 5 show various features that may be identified in a set of one or more layer images constructed from a light field image obtained from a dorsal side of a forearm of a user near the user's wrist.

FIG. 4 shows various features that may be identified in a set of one or more layer images constructed from a light field image obtained from a dorsal side of a forearm near a wrist. The features may be associated with structures at or just beneath the surface of a user's skin (e.g., on or into the epidermis 400), or structures that start at the surface of the user's skin and extend deeper beneath the user's skin (e.g., into the dermis 402).

Examples of features associated with structures at or just beneath the surface of a user's skin include a vascular pattern 404 (e.g., a blood perfusion pattern in skin), a pigmentation pattern 406 (e.g., a skin (or melanin) pigmentation pattern), a small scale folding pattern of skin, a hair follicle opening pattern 408, and a pore opening pattern 410. A blood perfusion pattern in skin (e.g., a capillary blood perfusion pattern) may vary significantly with temperature, exercise, and other biological or environmental variables, and may have limited use for biometric identification. A skin pigmentation pattern may be more stable than a blood perfusion pattern in skin, but may vary with exposure to ultraviolet light (e.g., sunlight).

Examples of features associated with structures that start at the surface of a user's skin and extend beneath the user's skin include a hair follicle pattern 412, and a pore pattern 414 (e.g., sweat ducts). In some cases, hair follicles may be identified by first identifying points at which hair intersects (or enters) the epidermis (e.g., a hair follicle opening pattern 408 in one or more shallow layers of a forearm), and then correlating these points with structures (e.g., cross-sections of hair follicles) identified in deeper layers of a forearm. In some cases, sweat ducts may be identified based on the different light absorption rates of sweat ducts and surrounding turbid tissues, which may contain different amounts of water and absorb light (e.g., infrared light) at different rates. Similarly to the identification of hair follicles, pores may identified in surface or shallow layers of a forearm (e.g., in a pore opening pattern 410) and correlated with structures (e.g., cross-sections of sweat glands) identified in deeper layers of a forearm.

Figure 5:
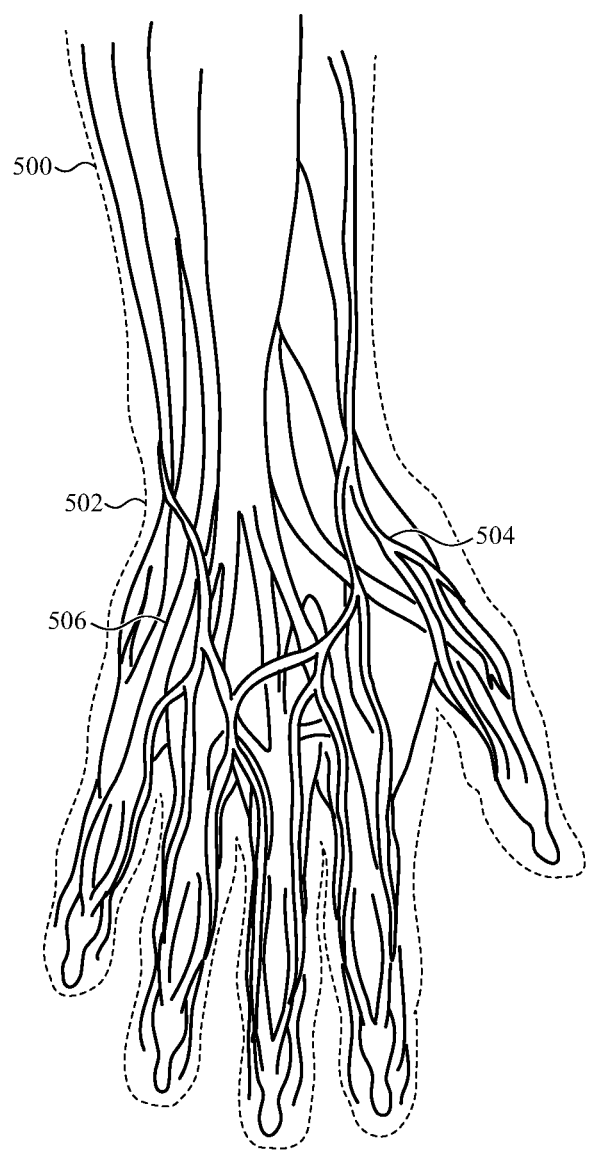

FIG. 5 shows additional features that may also or alternatively be identified in a set of one or more layer images constructed from a light field image obtained from a dorsal side of a forearm 500 near a wrist 502. The features may be associated with structures deep beneath the surface of a user's skin (e.g., in subcutaneous tissue or bone).

Examples of features associated with structures deep beneath the surface of a user's skin include a vascular pattern 504 (e.g., a vein pattern, an artery pattern, a blood perfusion pattern in tendons, or a blood perfusion pattern in fascia), a connective tissue pattern 506 (e.g., a tendon pattern), and a bone shape pattern. A vascular pattern in subcutaneous tissue, and particularly a vein pattern or an artery pattern, may vary less than a vascular pattern in epidermal or dermal tissue. A vein pattern or an artery pattern, for example, may also include vein or artery cross-sectional size information that provides an extra level of detail and more biometric entropy than can be obtained for a capillary blood perfusion pattern.

Figure 6:
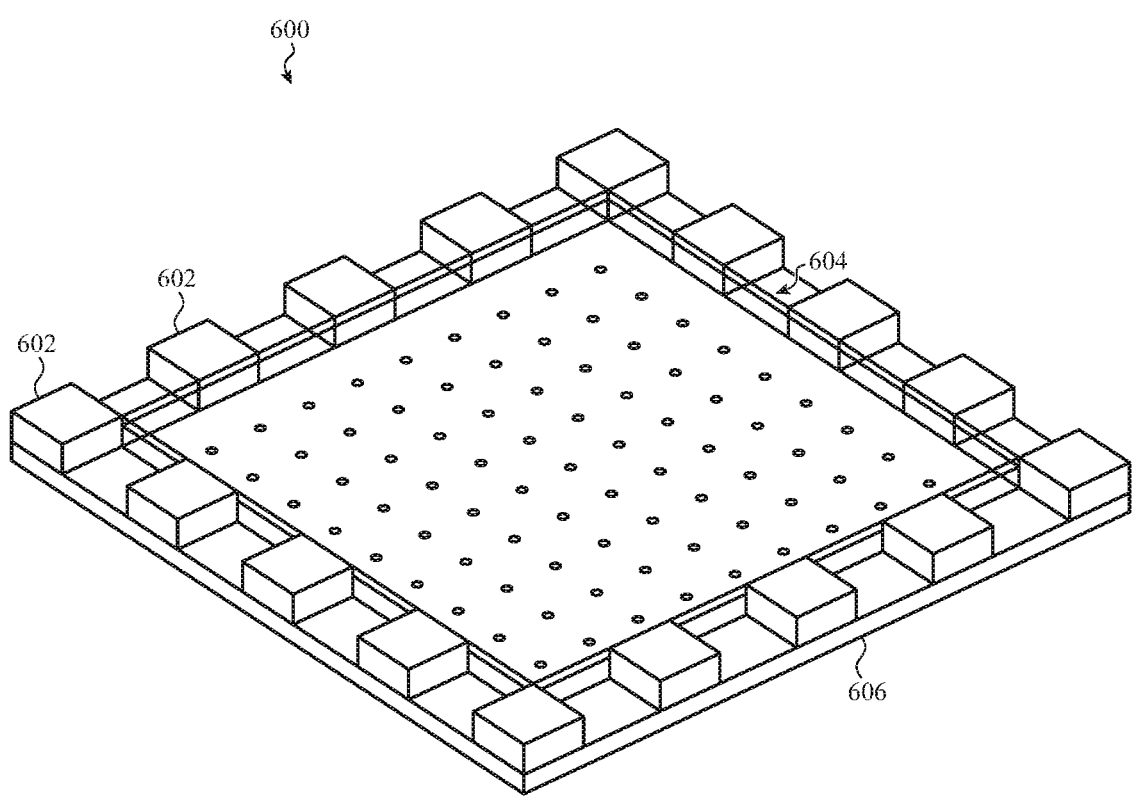
FIGS. 6-8 show a set of components that may be included in a biosensor system such as the biosensor system shown in FIGS. 2 and 3.
Figure 7:
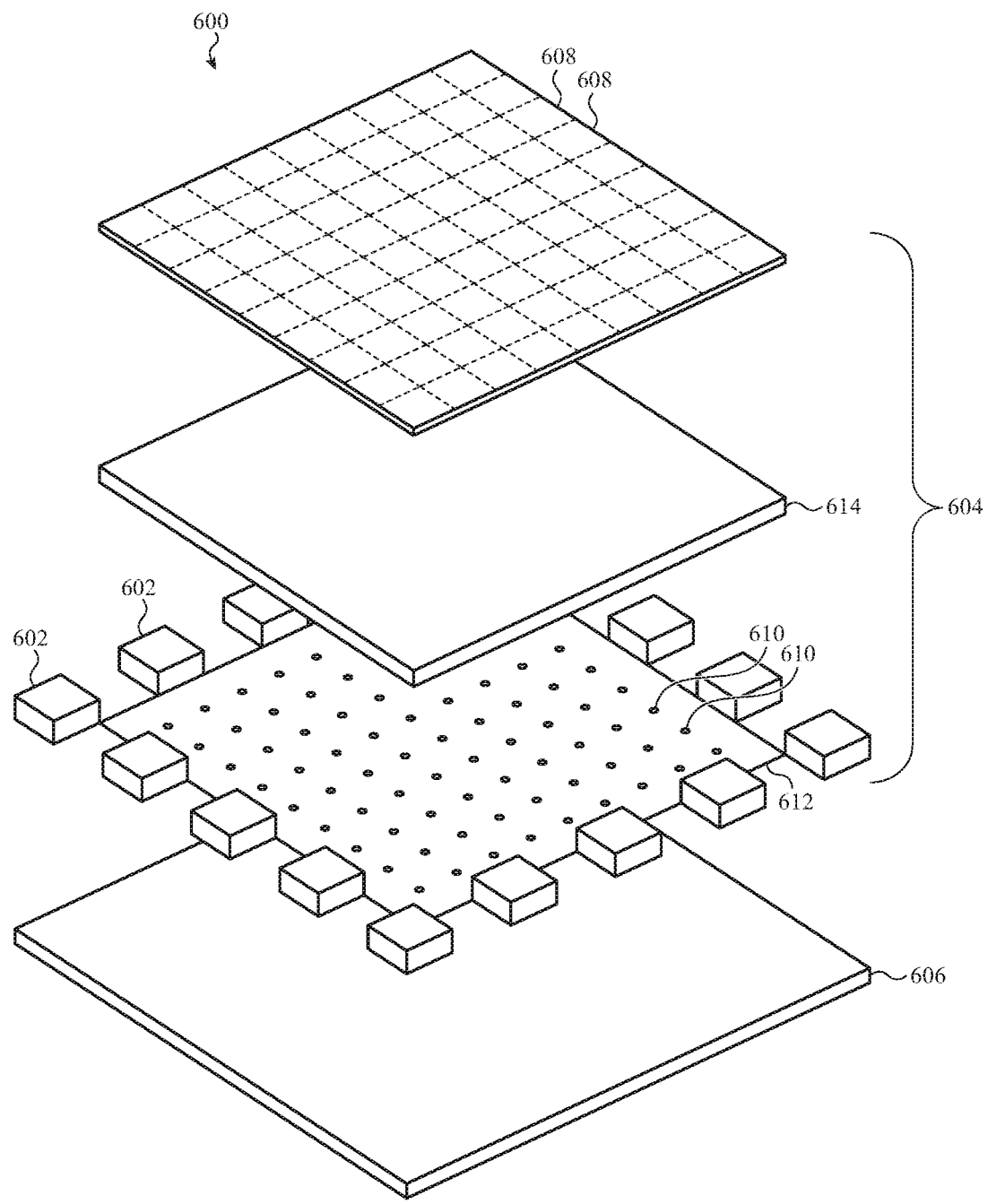
Figure 8:
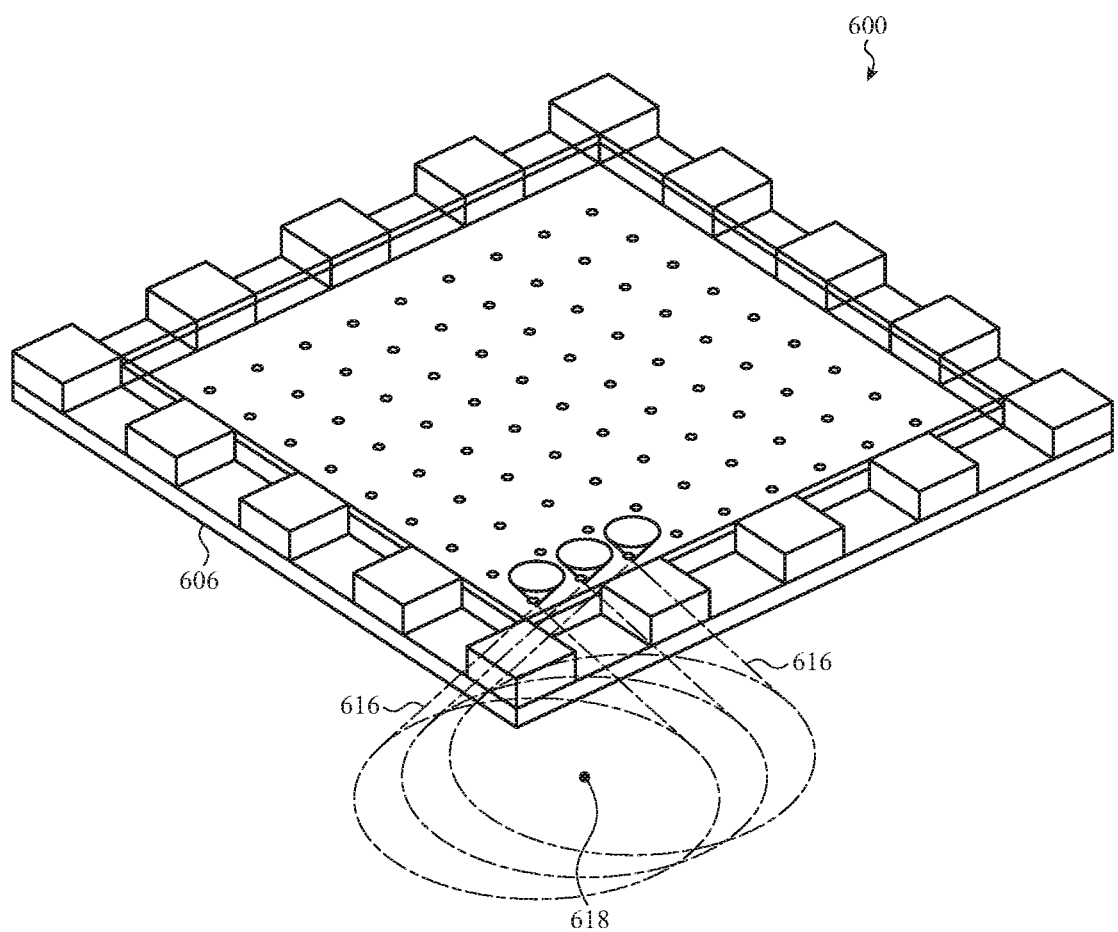

FIGS. 6-8 show a set of components 600 that may be included in a biosensor system such as the biosensor system 116 shown in FIGS. 2 and 3. FIGS. 6 and 8 show the components 600 in assembled form, and FIG. 7 shows the components 600 in exploded form. The biosensor system includes a set of light emitters 602 and a light field camera 604, both of which may be positioned adjacent an interior surface of a cover 606. The cover 606 may be the backside cover 114 that is mounted to the housing 106 of the watch body 102 shown in FIGS. 1-3.

The light emitters 602 may be positioned to emit light into a dorsal side of a forearm near a wrist of a user when an exterior surface of the cover 606 is positioned adjacent (e.g., on) the dorsal side of the forearm near the wrist. The light field camera 604 may be positioned to receive emissions of the light (i.e., the light emitted by the light emitters 602) from the dorsal side of the forearm near the wrist.

As shown in FIG. 7, the light field camera 604 may include a first array of non-overlapping image sensing regions 608, and a second array of light-transmissive elements (e.g., an array of pinholes 610 defined by a pinhole mask 612). The pinhole mask, including the light-transmissive elements (e.g., pinholes), may be positioned between the array of non-overlapping image sensing regions 608 and the interior surface of the cover 606. In some embodiments, the pinhole mask 612 may include a substrate made of opaque plastic or another opaque material. In some embodiments, the pinhole mask 612 may include patterned ink deposited on the interior surface of the cover 606.

The array of non-overlapping image sensing regions 608 may be aligned with the array of light-transmissive elements to form a set of micro-cameras. In some embodiments, and as shown, the array of non-overlapping image sensing regions 608 may include regions of a single image sensor. Alternatively (and not shown), the array of non-overlapping image sensing regions 608 may include discrete image sensors (e.g., one image sensor per image sensing region, or one image sensor per subset of image sensing regions). The light field camera 604 may optionally include a spacer 614 that separates (e.g., is between) the array of non-overlapping image sensing regions 608 and the array of light-transmissive elements. In some embodiments, the spacer 614 may include a layer of glass.

The light emitters 602 may be positioned around the light field camera 604, and may emit light from around the light field camera 604. In some embodiments, the light emitters 602 may include light emitting diodes (LEDs). In some embodiments, the light emitters 602 may include infrared emitters.

The micro-cameras may have fields of view 616 that overlap on a side of the cover 606 opposite the light field camera 604, as shown in FIG. 8. In some cases, the fields of view 616 may begin to overlap within the cover 606. By way of example, the fields of view 616 may be conical. When the external surface of the cover 606 is positioned adjacent a forearm of a user near the user's wrist, the conical fields of view 616 may extend into the forearm and define the extent of the three-dimensional space 302 described with reference to FIG. 3.

Figure 9:
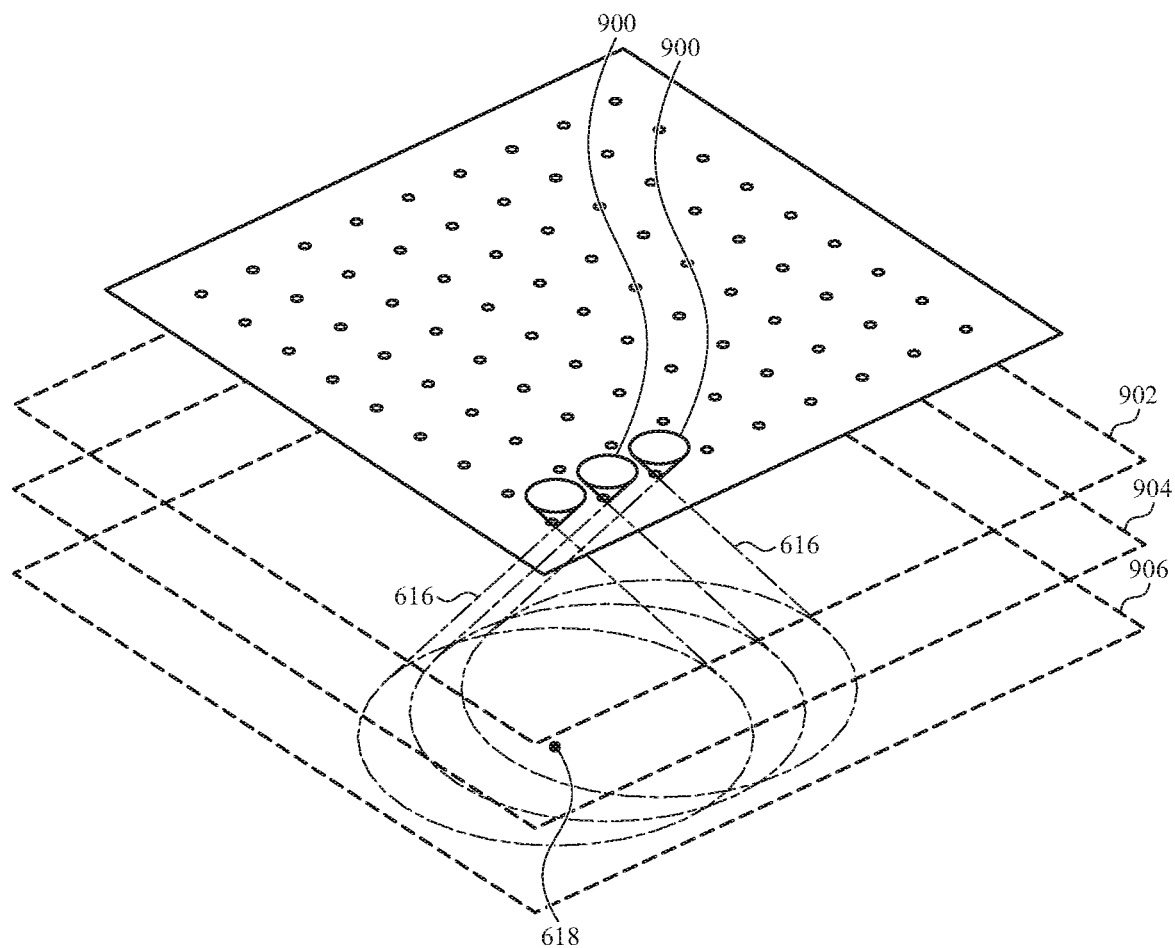
FIG. 9 shows the conical fields of view of some of the micro-cameras shown in FIGS. 6-8, as well as the feature of the forearm shown in FIG. 8.

As shown in FIG. 8, a feature 618 of a forearm may fall within the fields of view 616 of multiple micro-cameras. FIG. 9 shows the conical fields of view 616 of some of the micro-cameras shown in FIGS. 6-8, as well as the feature 618 of the forearm shown in FIG. 8. The light emitters 602 and light field camera 604 described with reference to FIGS.

6-8 may be operated to obtain a light field image at an array of image sensing regions 900 positioned at a first plane. A synthetic focusing operation may then be performed on the light field image (e.g., by constructively and/or destructively combining the pixel values of a set of images included in the light field image) to construct images of one or more layers 902, 904, 906 of the forearm. An image of one layer (e.g., the layer 906) may include, or bring into focus, the feature 618 of the forearm. Images of other layers (e.g., layers 902 and 904) may not include, or obfuscate, the feature 618 of the forearm.

Figure 10:
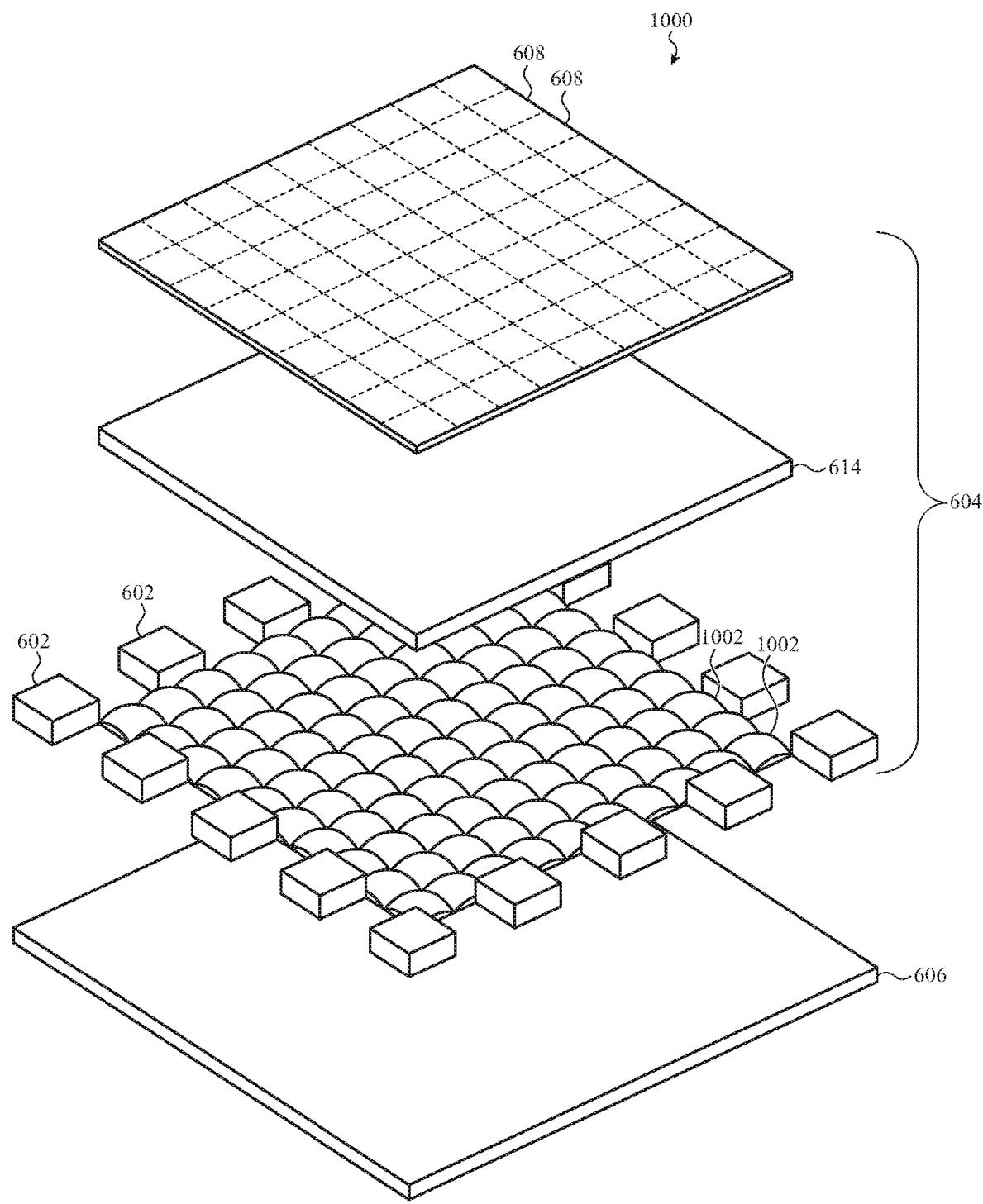
FIG. 10 shows an exploded view of another set of components that may be included in a biosensor system such as the biosensor system shown in FIGS. 2 and 3.

FIG. 10 shows an exploded view of another set of components 1000 that may be included in a biosensor system such as the biosensor system 116 shown in FIGS. 2 and 3. The components 1000 may include the cover 606, set of light emitters 602, array of non-overlapping image sensing regions 608, array of light-transmissive elements, and spacer 614 described with reference to FIGS. 6-8. However, in the biosensor system of FIG. 10, the light-transmissive elements may include a set of lenses 1002, instead of or in addition to pinholes. In some embodiments, the set of lenses 1002 may be included in a microlens array (MLA).

Figure 11:
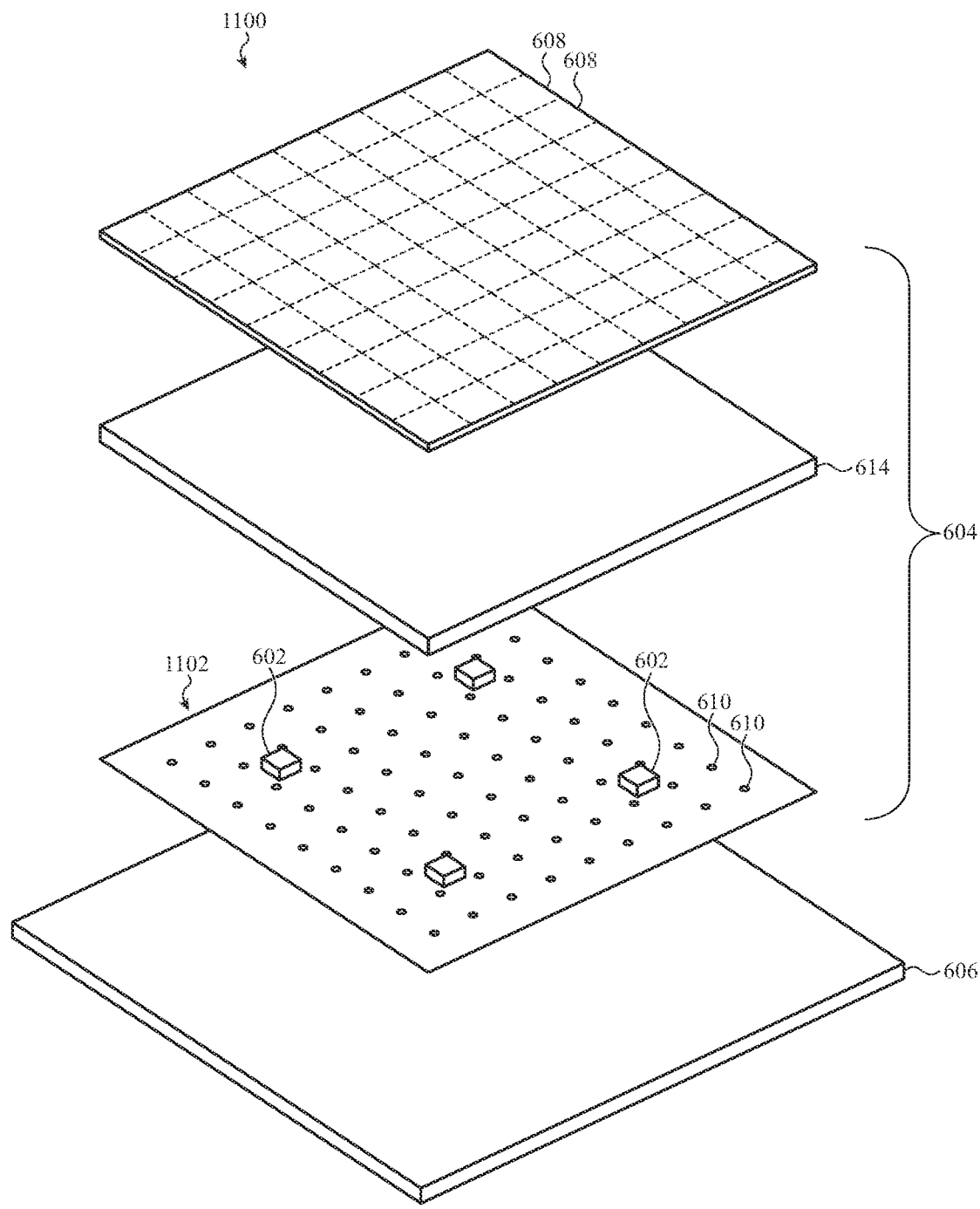
FIG. 11 shows an exploded view of another set of components that may be included in a biosensor system such as the biosensor system shown in FIGS. 2 and 3.

FIG. 11 shows an exploded view of another set of components 1100 that may be included in a biosensor system such as the biosensor system 116 shown in FIGS. 2 and 3. The components 1100 may include the cover 606, set of light emitters 602, array of non-overlapping image sensing regions 608, array of light-transmissive elements, and spacer 614 described with reference to FIGS. 6-8. However, in the biosensor system of FIG. 11, the set of light emitters 602 may be intermingled with the set of micro-cameras, and may be positioned to emit light from within a boundary defined by the set of micro-cameras.

In some embodiments of the biosensor systems described with reference to FIGS. 2, 3, 6-8, 10, and 11, the light emitters 602 of a biosensor system may include light emitters of different type, such as light emitters that emit different wavelengths of light. Operation of a biosensor system while simultaneously or sequentially activating light emitters of different type (e.g., of different wavelengths) can help differentiate features having different light absorption and reflection spectra. For example, melanin pigmentation can have a very different absorption spectrum than blood. Hence, a vascular pattern (e.g., a blood perfusion pattern in skin) may in some cases be distinguished from a pigmentation pattern (e.g., a skin (or melanin) pigmentation pattern) based at least in part on whether the features of the patterns absorb or reflect light of a particular wavelength.

In some embodiments, light emitters may be tuned to emit different wavelengths of light, or different color filters may be positioned over (or deposited on) different light emitters.

Figure 12:
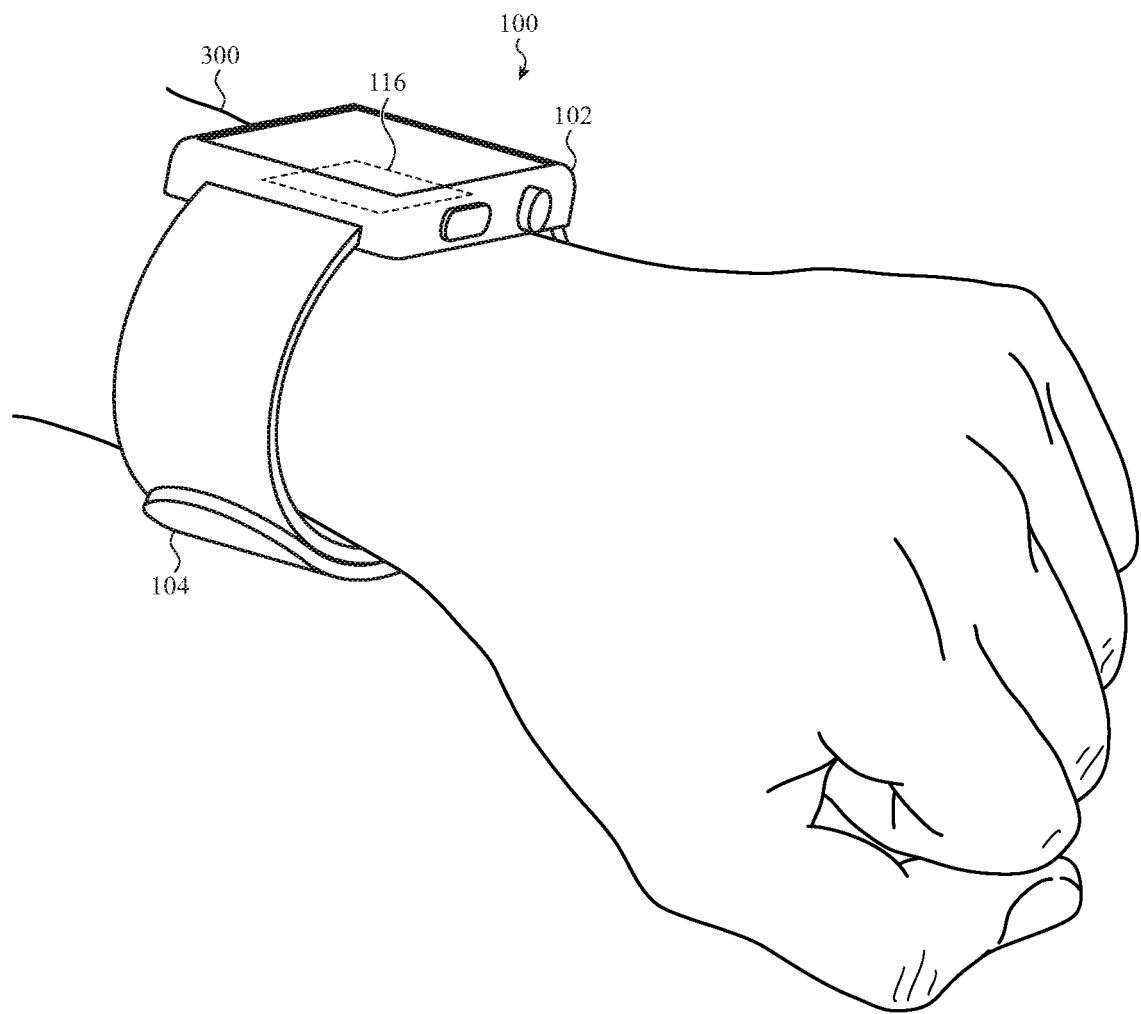
FIG. 12 shows a watch attached to, and tilted on, a forearm of a user near the user's wrist.

Referring now to FIG. 12, there is shown a watch attached to a forearm of a user near the user's wrist. By way of example, the watch may be the watch 100 described with reference to FIGS. 1-3. As previously described, attachment of the watch 100 to the forearm 300 near the wrist may position a first or exterior surface of a cover 114 (i.e., a surface exterior to a watch body 102) adjacent a dorsal side of the forearm 300 near the user's wrist. However, in contrast to the watch position shown in FIG. 3, the watch body 102 is tilted with respect to the dorsal side of the forearm 300 in FIG. 12. As a result, the biosensor system 116 and included light field camera are tilted with respect to the dorsal side of the forearm 300.

Figure 13:
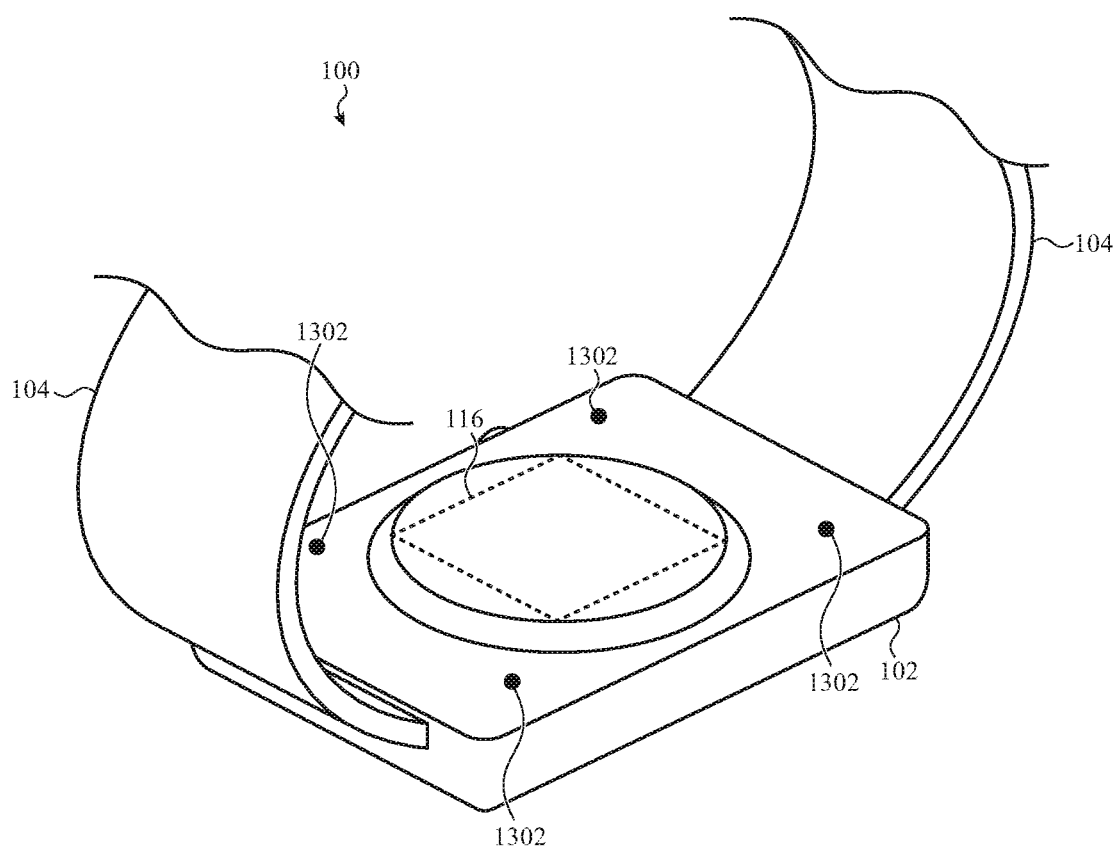
FIG. 13 shows an alternative embodiment of the watch described with reference to FIGS. 1-3, in which a tilt sensor is included in the watch.

In some embodiments, the biosensor system 116 may be configured to compensate for tilt of a light field camera with respect to the dorsal side of the forearm 300. FIG. 13 shows an alternative embodiment of the watch 100 described with reference to FIGS. 1-3, in which a tilt sensor 1300 is included in the watch 100. The tilt sensor 1300 may be configured to detect the tilt described with reference to FIG. 12, so that a processor associated with the biosensor system 116 may compensate for the tilt. By way of example, the tilt sensor 1300 is shown to include a set of proximity sensors (e.g., four proximity sensors 1302). The proximity sensors 1302 may be capacitive sensors, optical sensors, other types of sensors, or a combination thereof.

The proximity sensors 1302 may determine respective distances between the watch body 102 (or a sensing plane of the biosensor system 116) and the skin of a user's forearm, and may determine a complex angle (e.g., a set of angles in x, y, and z planes) between the sensing plane and the skin.

Figure 14:
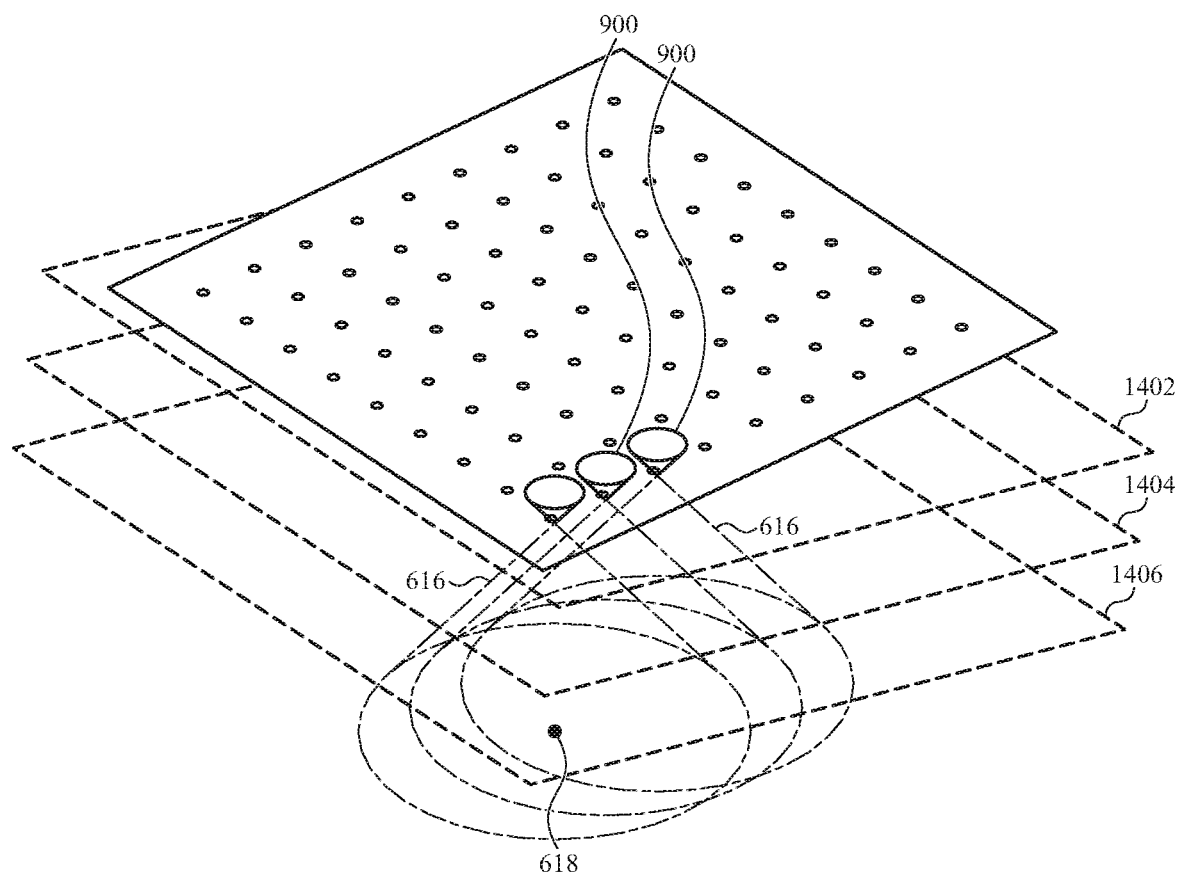
FIG. 14 shows the conical fields of view of some of the micro-cameras shown in FIGS. 6-8, as well as the feature of the forearm shown in FIG. 8.

FIG. 14 shows the conical fields of view 616 of some of the micro-cameras shown in FIGS. 6-8, as well as the feature 618 of the forearm shown in FIG. 8. As described with reference to FIG. 9, the light emitters and light field camera described with reference to FIGS. 6-8 may be operated to obtain a light field image at an array of image sensing regions 900 positioned at a first plane. However, in contrast to the synthetic focusing operation described with reference to FIG. 9, the synthetic focusing operation illustrated in FIG. 14 may be performed on the light field image (e.g., by constructively and/or destructively combining the pixel values of a set of images included in the light field image) while compensating for tilt of a sensing plane (i.e., the plane including image sensing regions 900) with respect to a user's skin Alternatively, the tilt may be compensated for prior to performing the synthetic focusing operation (e.g., by distorting the elemental images of the light field image based on the determined tilt). Thus, images may be constructed for layers 1102, 1104, 1106 of the forearm that intersect the conical fields of view 616 of the micro-cameras at an angle (i.e., the images may be normalized so that the images are parallel to the surface of the skin instead of parallel to the sensing plane defined by image sensing regions 900). In some embodiments, images may be normalized using a procedure such as shear-warp factorization.

In alternative embodiments, tilt of a biosensor system, light field camera, or sensing plane with respect to the skin of a user's forearm may be determined using the light field camera. For example, a synthetic focusing operation may be performed to determine when the surface of the skin (e.g., features on the surface of the skin) comes into focus at some or all of the micro-cameras in the light field camera. Depths associated with the layers at which the surface of the skin comes into focus may be determined, and the determined depths may be used similarly to distances determined by proximity sensors to determine the tilt of the biosensor system, light field camera, or sensing plane with respect to the skin of the user's forearm.

In further alternate embodiments, a processor associated with a biosensor system including a light field camera may determine a tilt of the biosensor system, light field camera, or sensing plane with respect to the skin of a user's forearm, and then: 1) warn the user that the tilt exists, 2) prompt the user to reposition the biosensor system or device that includes the biosensor system, and/or 3) instruct the user on how to reposition the biosensor system or device.

A biosensor system, such as one of the biosensor systems described with reference to FIGS. 2, 3, and 6-14, may be randomly positioned in various locations on the dorsal side of a forearm near a user's wrist. For example, the position of the biosensor system may vary with each attachment of a device that includes the biosensor system to the user's forearm, or with the user's adjustment of a watch band or other member used to secure the device to the user's forearm, or with movement of the user, or as a result of the user intentionally moving the device to make the device feel comfortable based on environmental conditions. To account for random positioning of the biosensor system on the user's forearm, the biosensor system may capture multiple light field images from different positions during a bioauthentication enrollment operation or health monitoring baselining operation. The multiple light field images may captured at a predetermined time, such as when the device or the user initiates an enrollment or baselining operation, or in the background when the device is worn by the user and not being used for other purposes. The multiple light field images may be used to construct a composite template of the user's forearm. The composite template may be associated with a larger three-dimensional space than the three-dimensional space associated with a single light field image.

Figure 15:
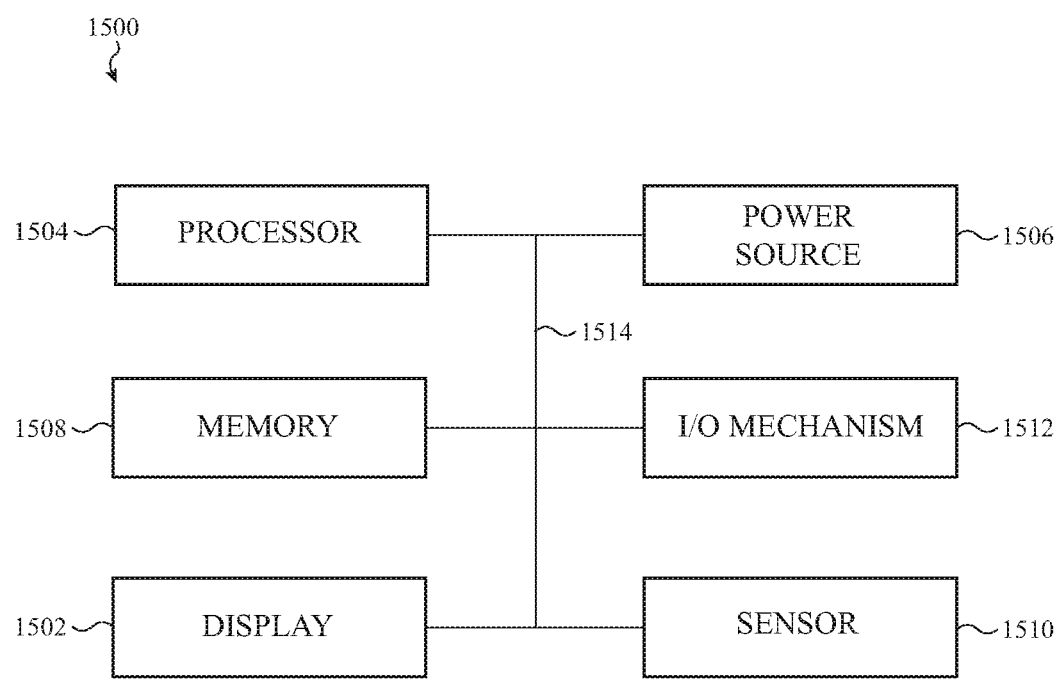
FIG. 15 shows a sample electrical block diagram of an electronic device such as a watch or other wearable electronic device.

FIG. 15 shows a sample electrical block diagram of an electronic device 1500, which electronic device 1500 may in some cases take the form of any of the watches or other wearable electronic devices described with reference to FIGS. 1-14, or other portable or wearable electronic devices. The electronic device 1500 may include a display 1502 (e.g., a light-emitting display), a processor 1504, a power source 1506, a memory 1508 or storage device, a sensor 1510, and an input/output (I/O) mechanism 1512 (e.g., an input/output device, or input/output port). The processor 1504 may control some or all of the operations of the electronic device 1500. The processor 1504 may communicate, either directly or indirectly, with some or all of the components of the electronic device 1500. For example, a system bus or other communication mechanism 1514 may provide communication between the processor 1504, the power source 1506, the memory 1508, the sensor 1510, and the input/output mechanism 1512.

The processor 1504 may be implemented as any electronic device capable of processing, receiving, or transmitting data or instructions. For example, the processor 1504 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

It should be noted that the components of the electronic device 1500 may be controlled by multiple processors. For example, select components of the electronic device 1500 (e.g., the sensor 1510) may be controlled by a first processor and other components of the electronic device 1500 (e.g., the display 1502) may be controlled by a second processor, where the first and second processors may or may not be in communication with each other. In some cases, the processor 1504 may perform one or more of a bioauthentication operation, a bioauthentication enrollment operation, a secure transaction operation, a health monitoring operation, a health assessment operation, and so on.

The power source 1506 may be implemented using any device capable of providing energy to the electronic device 1500. For example, the power source 1506 may be one or more batteries or rechargeable batteries. Additionally or alternatively, the power source 1506 may be a power connector or power cord that connects the electronic device 1500 to another power source, such as a wall outlet.

The memory 1508 may store electronic data that can be used by the electronic device 1500. For example, the memory 1508 may store electrical data or content such as, for example, audio and video files, documents and applications, device settings and user preferences, timing signals, control signals, data structures or databases, or reference sets of features used in a bioauthentication, health monitoring, or health assessment operation. The memory 1508 can be configured as any type of memory. By way of example only, the memory 1508 may be implemented as random access memory, read-only memory, Flash memory, removable memory, other types of storage elements, or combinations of such devices.

The electronic device 1500 may also include one or more sensors 1510 positioned almost anywhere on the electronic device 1500. The sensor(s) 1510 can be configured to sense one or more type of parameters, such as but not limited to, pressure, light (e.g., a light field), touch, heat, movement, relative motion, biometric data (e.g., biological images or parameters), and so on. For example, the sensor(s) 1510 may include a heat sensor, a position sensor, a light or optical sensor, an accelerometer, a pressure transducer, a gyroscope, a magnetometer, a health monitoring sensor, a light field camera, and so on. Additionally, the one or more sensors 1510 can utilize any suitable sensing technology, including, but not limited to, capacitive, ultrasonic, resistive, optical, light field, ultrasound, piezoelectric, and thermal sensing technology. In some examples, the sensor(s) 1510 may include one of the biosensor systems described herein.

The I/O mechanism 1512 may transmit and/or receive data from a user or another electronic device. An I/O device may include a display, a touch sensing input surface, one or more buttons (e.g., a graphical user interface "home" button), a crown, one or more cameras, one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections.

Figure 16:
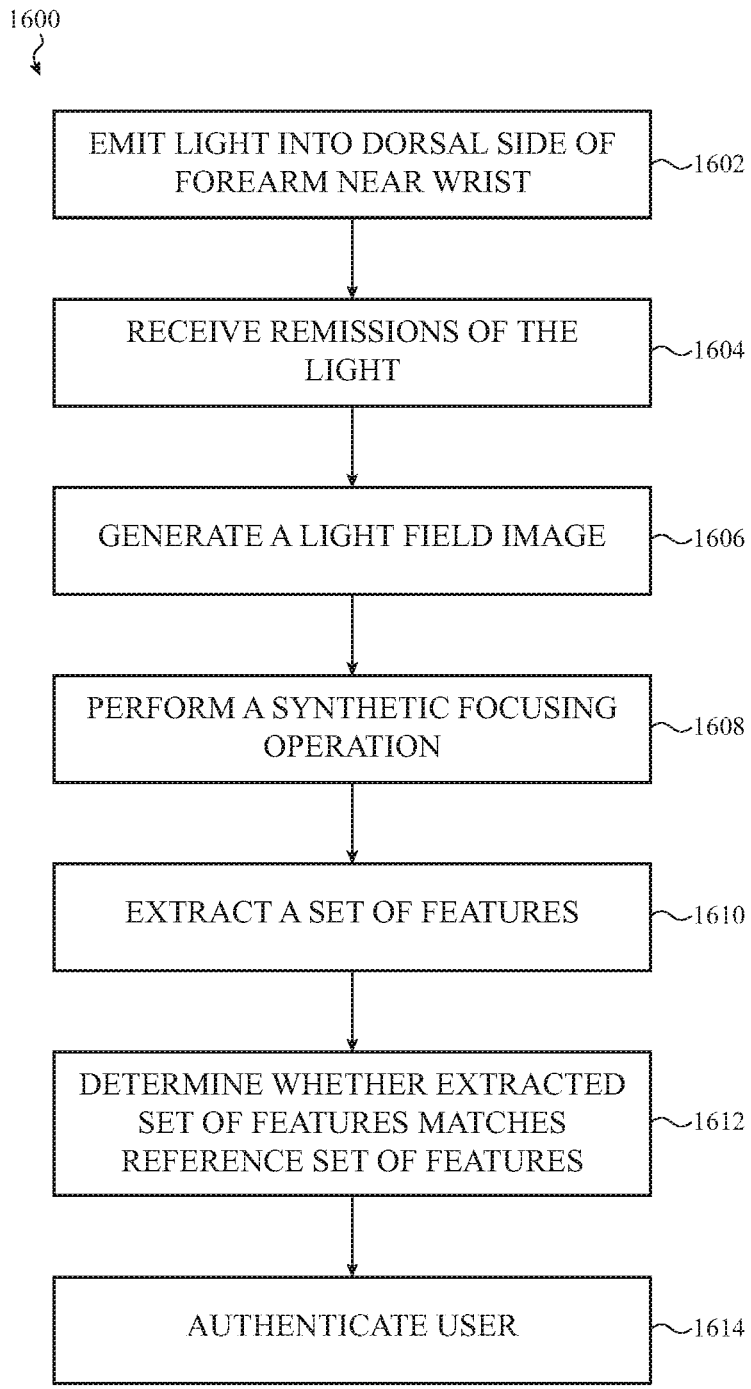
FIG. 16 shows an example method of authenticating a user of a watch or other wearable electronic device.

FIG. 16 shows an example method 1600 of authenticating a user of a watch or other wearable electronic device, such as one of the watches or wearable electronic devices described herein.

At block 1602, the method may include emitting light into a dorsal side of a forearm near a wrist of the user. The operation(s) at 1602 may be performed, for example, using the biosensor system described with reference to FIGS. 2, 3, and 6-15, the light emitter(s) described with reference to FIGS. 2, 3, 6-8, 10, and 11, or the processor described with reference to FIGS. 2, 3, 6-11, and 13-15.

At block 1604, the method may include receiving remissions of the light from the dorsal side of the forearm near the wrist of the user. The remissions of the light may be received using a light field camera. The operation(s) at 1604 may be performed, for example, using the biosensor system described with reference to FIGS. 2, 3, and 6-15, the light field camera described with reference to FIGS. 2, 3, and 6-14, or the processor described with reference to FIGS. 2, 3, 6-11, and 13-15.

At block 1606, the method may include generating a light field image from the remissions of the light. The operation(s) at 1606 may be performed, for example, using the biosensor system described with reference to FIGS. 2, 3, and 6-15, or the processor described with reference to FIGS. 2, 3, 6-11, and 13-15.

At block 1608, the method may include performing a synthetic focusing operation on the light field image to construct at least one image of at least one layer of the forearm near the wrist. The operation(s) at 1608 may be performed, for example, using the biosensor system described with reference to FIGS. 2, 3, and 6-15, or the processor described with reference to FIGS. 2, 3, 6-11, and 13-15.

At block 1610, the method may include extracting a set of features from the at least one image. The operation(s) at 1610 may be performed, for example, using the biosensor system described with reference to FIGS. 2, 3, and 6-15, or the processor described with reference to FIGS. 2, 3, 6-11, and 13-15.

In some embodiments, the features extracted at block 1610 may include at least one or two of a hair follicle opening pattern, a hair follicle pattern, a vascular pattern, a vein pattern, an artery pattern, a blood perfusion pattern in skin, a blood perfusion pattern in tendons, a blood perfusion pattern in fascia, a tendon pattern, a connective tissue pattern, a skin pigmentation pattern, a small scale folding pattern of skin, a pore opening pattern, a pore pattern, and a bone shape pattern. In some embodiments, the features may include a relationship between at least two of a hair follicle opening pattern, a hair follicle pattern, a vascular pattern, a vein pattern, an artery pattern, a blood perfusion pattern in skin, a blood perfusion pattern in tendons, a blood perfusion pattern in fascia, a tendon pattern, a connective tissue pattern, a skin pigmentation pattern, a small scale folding pattern of skin, a pore opening pattern, a pore pattern, and a bone shape pattern.

At block 1612, the method may include determining whether the set of features matches a reference set of features. The operation(s) at 1612 may be performed, for example, using the biosensor system described with reference to FIGS. 2, 3, and 6-15, or the processor described with reference to FIGS. 2, 3, 6-11, and 13-15.

At block 1614, the method may include authenticating the user in response to the set of features matching the reference set of features. The operation(s) at 1614 may be performed, for example, using the biosensor system described with reference to FIGS. 2, 3, and 6-15, or the processor described with reference to FIGS. 2, 3, 6-11, and 13-15.

In alternative embodiments of the method 1600, the operation(s) at block 1614 may include the performance of a health monitoring, health assessment, payment, banking, or other secure transaction operation. In some embodiments, the operation(s) at block 1612 may not be performed, and the operation(s) at block 1614 may include a biauthentication enrollment operation or health monitoring baselining operation.

In some embodiments of the method 1600, the method may further include determining a tilt of the light field camera with respect to the dorsal side of the forearm near the wrist, and compensating for the determined tilt prior to or while performing the synthetic focusing operation, as described for example with reference to FIGS. 12-14.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A watch body wearable electronic device, comprising:
   a housing;
   a front side cover mounted to the housing;
   a back side cover mounted to the housing;
   a display disposed within the housing and viewable through the front side cover;
   a light field camera positioned behind the display and disposed to image a body part of a user through the back side cover; and
   a processor configured to operate the light field camera, obtain a light field image of the body part from the light field camera, and perform a synthetic focusing operation on the light field image to construct at least one image of at least one layer of the body part.

2. The wearable electronic device of claim 1, wherein the light field camera comprises:
   an array of non-overlapping image sensing regions;
   a pinhole mask positioned between the array of non-overlapping image sensing regions and the back side cover; and
   a spacer between the array of non-overlapping image sensing regions and the pinhole mask; wherein,
   the array of non-overlapping image sensing regions is aligned with an array of pinholes in the pinhole mask to form a set of micro-cameras having fields of view that overlap exterior to the wearable electronic device; and
   the processor is further configured to extract a set of features from the at least one image, determine whether the set of features matches a reference set of features, and perform an operation in response to whether the set of features matches the reference set of features.

3. The wearable electronic device of claim 1, wherein the processor is further configured to extract a set of features from the at least one image, determine whether the set of features matches a reference set of features, and perform an operation in response to whether the set of features matches the reference set of features.

4. The wearable electronic device of claim 3, wherein the operation comprises a bioauthentication operation.

5. The wearable electronic device of claim 1, further comprising:
   a set of light emitters; wherein,
   the light field camera comprises a set of micro-cameras having fields of view that overlap exterior to the wearable electronic device; and
   the set of light emitters is positioned to emit light from within a boundary defined by the set of micro-cameras.

6. The wearable electronic device of claim 1, further comprising:
   a light emitter positioned to emit light through the back side cover.

7. A wearable electronic device, comprising:
   a housing having a front side and a back side;
   a light emitter positioned within the housing and configured to emit light through the back side of the housing into a body part of a user;
   a light field camera positioned within the housing and configured to receive remissions of the light through the back side of the housing; and
   a processor configured to obtain at least one image of the body part from the light field camera.

8. The wearable electronic device of claim 7, further comprising:

a set of proximity sensors; wherein,
an output provided by the set of proximity sensors triggers the processor to obtain the at least one image of the body part from the light field camera.

9. A method of authenticating a user of a wearable electronic device, comprising:
emitting light into a body part of the user;
receiving, using a light field camera, remissions of the light from the body part of the user;
generating a light field image from the remissions of the light;
performing a synthetic focusing operation on the light field image to construct at least one image of at least one layer of the body part;
extracting a set of features from the at least one image;
determining whether the set of features matches a reference set of features; and
authenticating the user in response to the set of features matching the reference set of features.

10. The wearable electronic device of claim 1, wherein the processor is further configured to extract a blood perfusion pattern from the at least one image.

11. The wearable electronic device of claim 10, wherein the blood perfusion pattern comprises at least one of:
a blood perfusion pattern in skin;
a blood perfusion pattern in tendons; or
a blood perfusion pattern in fascia.

12. The wearable electronic device of claim 1, wherein the processor is further configured to extract a vascular pattern from the at least one image.

13. The wearable electronic device of claim 1, wherein the processor is further configured to extract a pigmentation pattern of the body part from the at least one image.

14. The wearable electronic device of claim 1, wherein the processor is further configured to extract a pore pattern from the at least one image.

15. The wearable electronic device of claim 1, wherein the processor is further configured to perform a bioauthentication of the user of the wearable electronic device, the bioauthentication performed using the at least one image.

16. The wearable electronic device of claim 1, wherein:
the processor is further configured to,
extract a set of features of the body part from the at least one image; and
classify different features in the set of features based on at least one of feature size, feature depth, feature color, feature movement, feature variance between layers, or feature presence in multiple layers.

17. The wearable electronic device of claim 6, wherein the light emitter comprises an infrared emitter.

18. The wearable electronic device of claim 6, wherein the light emitter is configured to emit light into the body part.

19. The wearable electronic device of claim 7, wherein the processor is further configured to perform a health monitoring operation using the at least one image of the body part.

20. The wearable electronic device of claim 7, wherein:
the processor is further configured to,
extract a set of features from the at least one image;
determine the set of features matches a reference set of features; and
perform a health monitoring operation in response to the set of features matching the reference set of features.

21. The wearable electronic device of claim 7, wherein the processor is further configured to provide, to the user, feedback on a fitness level of the user, the feedback determined using the at least one image of the body part.

* * * * *

UNITED STATES PATENT AND TRADEMARK OFFICE
CERTIFICATE OF CORRECTION

Page 1 of 1

PATENT NO.         : 11,036,844 B2
APPLICATION NO.    : 17/024574
DATED              : June 15, 2021
INVENTOR(S)        : Dale Setlak et al.

It is certified that error appears in the above-identified patent and that said Letters Patent is hereby corrected as shown below:

In the Claims

Claim 1, Line 1:
1. A watch body wearable electronic device, comprising:
Should read as --1. A wearable electronic device, comprising:--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*